United States Patent
Kim

(10) Patent No.: US 10,027,653 B2
(45) Date of Patent: Jul. 17, 2018

(54) METHOD FOR PROVIDING USER AUTHORITY CERTIFICATION SERVICE

(71) Applicant: LSIS CO., LTD., Gyeonggi-do (KR)

(72) Inventor: Tae-Ho Kim, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 134 days.

(21) Appl. No.: 15/207,368

(22) Filed: Jul. 11, 2016

(65) Prior Publication Data
US 2017/0019397 A1    Jan. 19, 2017

(30) Foreign Application Priority Data
Jul. 13, 2015  (KR) .......................... 10-2015-0099044

(51) Int. Cl.
| H04L 29/06 | (2006.01) |
| G06F 21/33 | (2013.01) |
| H04L 9/32 | (2006.01) |

(52) U.S. Cl.
CPC .......... H04L 63/0823 (2013.01); G06F 21/33 (2013.01); H04L 9/3263 (2013.01); H04L 9/3265 (2013.01); H04L 9/3268 (2013.01); H04L 63/0884 (2013.01); G05B 2219/32404 (2013.01)

(58) Field of Classification Search
CPC ........................ H04L 63/0824; H04L 63/0884
See application file for complete search history.

(56) References Cited

U.S. PATENT DOCUMENTS

| 7,657,739 | B2 | 2/2010 | Nakano et al. |
| 8,245,042 | B2 * | 8/2012 | Chinen ............... G06F 21/6209 380/241 |
| 8,341,716 | B2 | 12/2012 | Sakayama et al. |
| 8,941,857 | B2 | 1/2015 | Abe |

(Continued)

FOREIGN PATENT DOCUMENTS

| JP | 2008-026932 A | 2/2008 |
| JP | 2010-160553 A | 7/2010 |

(Continued)

OTHER PUBLICATIONS

European Search Report dated Aug. 3, 2016 issued in corresponding European Application No. 16 17 3618.

*Primary Examiner* — Dao Q Ho
(74) *Attorney, Agent, or Firm* — K&L Gates LLP

(57) ABSTRACT

Embodiments of a method for providing user authority information management service are provided. In some embodiments, the method includes a client server sending a request for authority information to an authority service server, the client server receiving the authority information from the authority service server and comparing the received authority information with authority information maintained in a client server memory, determining whether or not to download the authority information based on a result of the comparison between the received authority information and the maintained authority information, updating the client server memory according to whether the authority information is downloaded, and the client server performing user authority certification for each process operation to be performed by the client server.

8 Claims, 8 Drawing Sheets

(56) References Cited

U.S. PATENT DOCUMENTS

2013/0290705 A1   10/2013  Lovmand
2014/0333952 A1*  11/2014  Abe ...................... G06F 3/1222
                                                                                 358/1.14

FOREIGN PATENT DOCUMENTS

| JP | 2013-084115 A | 5/2013 |
| JP | 6401952 B2 | 1/2014 |
| JP | 2014-219826 A | 11/2014 |
| KR | 10-2005-0045211 A | 11/2005 |
| KR | 10-2010-0027556 A | 3/2010 |
| KR | 10-2011-0096554 A | 8/2011 |
| WO | 2008/070857 A1 | 6/2008 |

* cited by examiner

- Prior art -

METHOD FOR PROVIDING USER AUTHORITY CERTIFICATION SERVICE

CROSS REFERENCE TO RELATED APPLICATIONS

This application claims the benefit of Korean Patent Application No. 10-2015-0099044, filed on Jul. 13, 2015 and entitled "METHOD FOR PROVIDING USER AUTHORITY CERTIFICATION SERVICE", which is hereby incorporated by reference in its entirety.

BACKGROUND

Technical Field

The present disclosure relates to a method for providing a user authority certification service. More particularly, the present disclosure relates to a method for providing a user authority certification service such that a client can stably perform engineering operations even if an authority service server is shut down or a communication network is disabled.

Description of the Related Art

A supervisory control and data acquisition (SCADA) system or energy management system (EMS) allows only a user having a proper authority to perform manipulation. That is, when an administrator performs a manipulation operation through a screen, the system checks if the administrator currently attempting to log in has a proper authority and allows the manipulation if the administrator has the proper authority.

Accordingly, all operations performed through the screen need to be subdivided (into, e.g., reading, writing, process execution/termination, control and other manipulations), and authority to perform the respective operations need to be individually granted to users.

The SCADA system or EMS provides a tool for the function of granting such authority. Herein, authorities need to be configured for respective users through an engineering PC, or the client needs to be allowed to add/delete user information and change authorities during real-time monitoring.

In addition, user authority information configured as above is collected and managing by an authority service server and all authority requests from the clients are subjected to the certification procedure through the authority service server.

In addition, to ensure stability of the system, engineering operations (e.g., database work and graphic engineering work) on the client side should not be affected, and certification of each engineering operation should be normally performed even if the authority service server is unable to operate or the communication network is disabled.

FIG. 1 is a flowchart illustrating a method for providing a user authority certification service according to the prior art.

As shown in FIG. 1, in conventional cases, only an authority service server is allowed to manage defined user authority information, and when the clients need user authority certification, the authority service server performs the certification.

That is, in performing each process, individual authority certification needs to be obtained for each operation (e.g., execution, logging in, management, logging out, and the like) from the authority service server.

According to the conventional method above, the clients can obtain user authority certification only from the authority service server, and thus the clients cannot perform any operation if the authority service server is shutdown or the network communication network is disabled.

SUMMARY

It is an aspect of some embodiments of the present disclosure to stably provide an authority certification service to users even if an authority service server is shut down or the communication network is disabled.

In accordance with one aspect of some embodiments, a method for providing a user authority certification service includes a client server sending a request for authority information to an authority service server, the client server receiving the authority information from the authority service server and comparing the received authority information with authority information maintained in a client server memory, determining whether or not to download the authority information based on a result of the comparison between the received authority information and the maintained authority information, updating the client server memory according to whether the authority information is downloaded, and the client server performing user authority certification.

In some embodiments, the authority information contains an authority information version.

In some embodiments, when an authority information version received from the authority service server is higher than an authority information version maintained by the client server in the determining of whether or not to download the authority information, the client server downloads the authority information from the authority service server.

In some embodiments, the performing of the user authority certification includes the client server obtaining the user authority certification for each process operation to be performed by the client server.

In some embodiments, the process operation is one selected from a group including process execution, logging in, process management and logging out.

In some embodiments, the client server sequentially obtains the authority certification for the process execution, logging in, process management and logging out.

In some embodiments, the authority service server updates the authority information by receiving updated user authority information from a user authority information configuration apparatus.

In some embodiments, the user authority information configuration apparatus is configured to download the authority information from the authority service server, update the downloaded authority information based on predetermined user authority information, and upload the updated authority information to the authority service server.

In some embodiments, the authority service server updates the authority information by receiving updated user authority information from the client server.

In some embodiments, when the client server obtains the authority certification for an authority configuration operation from the authority service server, the client server uploads the updated user authority information to the authority service server.

In some embodiments, the performing of the performing user authority certification includes the client server obtaining, when communication between the client server and the authority service server is possible, the user authority certification from the authority service server.

In some embodiments, the performing of the performing user authority certification includes the client server obtaining, when communication between the client server and the authority service server is not possible, the user authority certification from the client server memory.

In some embodiments, when communication between the client server and the authority service server is resumed while the client server is obtaining the user authority certification from the client server memory, the client server stops obtaining the user authority certification from the client server memory and resumes to obtain authority certification from the authority service server.

With a method for providing a user authority certification service according to an embodiment of the present disclosure, even if normal communication between clients and a server and an authority service server is not possible as in the case where the authority service server is shut down or the communication network is disabled, the authority certification service may be stably provided to the clients.

In particular, with a monitoring system such as an SCADA/EMS, even if the condition of the service of the authority service server is not normal due to, for example, maintenance of the server, the clients are allowed to normally perform engineering operations such as database work and graphic editing.

DETAILED DESCRIPTION

Reference will now be made in detail to embodiments of the present disclosure, examples of which are illustrated in the accompanying drawings. Wherever possible, the same reference numbers will be used throughout the drawings to refer to the same or like parts. As used herein, the suffixes "module" and "unit" are added or used interchangeably to simply facilitate preparation of this specification and are not intended to suggest meanings or functions distinguished therebetween. In describing embodiments disclosed in this specification, relevant well-known technologies may not be described in detail in order not to obscure the subject matter of the present disclosure. In addition, the accompanying drawings are merely intended to facilitate understanding of the embodiments disclosed in this specification and not to limit the technical spirit and scope of the present disclosure. The accompanying drawings should be understood as covering all equivalents and substitutions, without departing from the spirit and scope of the disclosure, as described in the claims.

Figure 1:
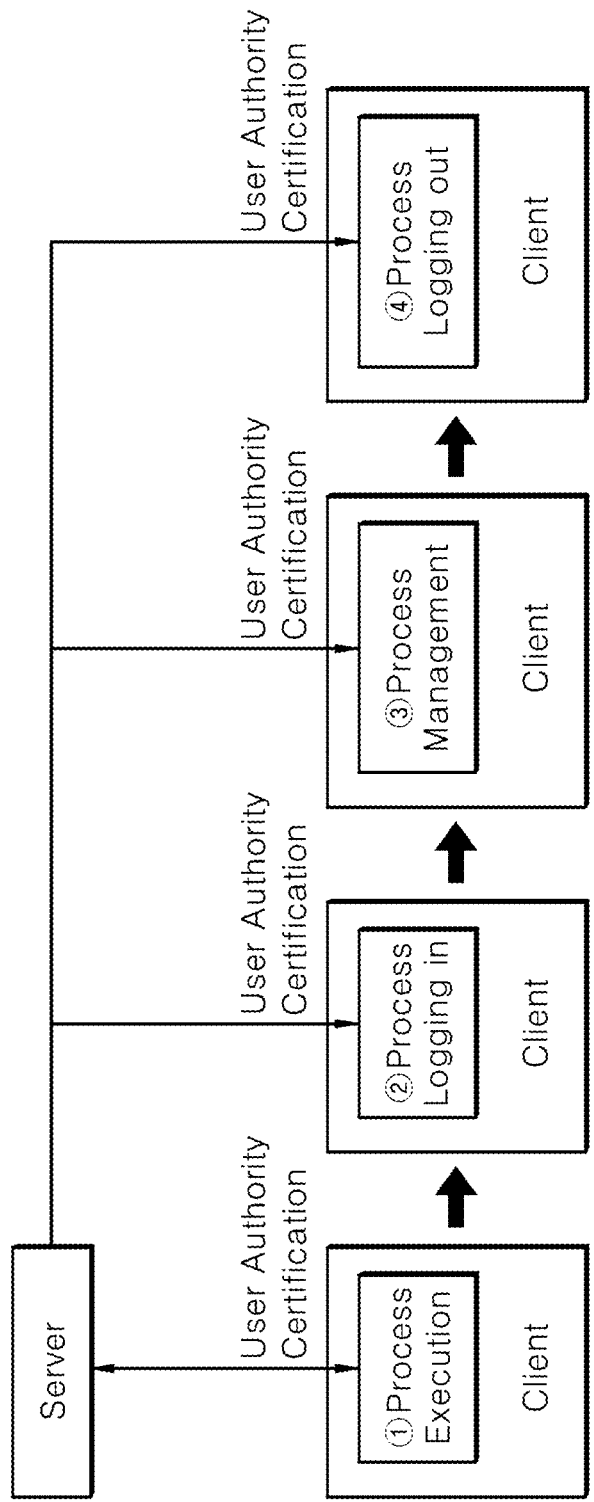
FIG. 1 is a flowchart illustrating a method for providing a user authority certification service according to the prior art.
Figure 2:
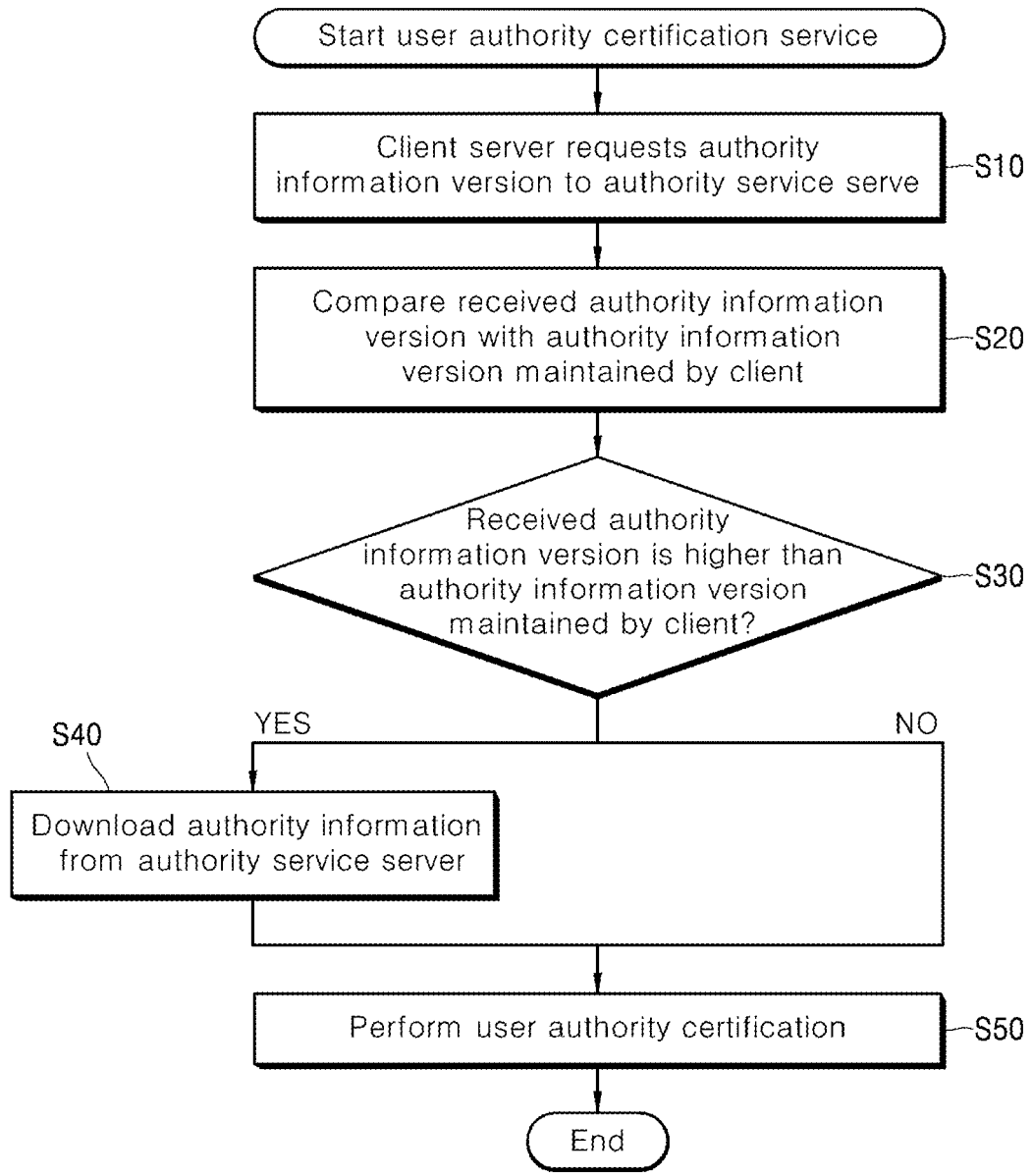
FIG. 2 is a flowchart illustrating a method for providing a user authority certification service according to an embodiment of the present disclosure.

FIG. 2 is a flowchart illustrating a method for providing a user authority certification service according to an embodiment of the present disclosure.

As shown in FIG. 2, in a method for providing a user authority certification service according to an embodiment of the present disclosure, once the user authority certification service is initiated, a client server makes a request to an authority service server for authority information (S10).

The requested authority information may contain the version of the authority information. FIG. 2 shows an example of authority information. FIG. 2 illustrates a case of requesting the authority information version. However, this is simply illustrative, and it is apparent that embodiments of the present disclosure are not limited thereto.

The client server compares the authority information version received from the authority service server with the authority information version maintained by the client server (S20).

As a result of comparison (S30), if the authority information version received from the authority service server is higher than the authority information version maintained by the client server (YES), the client server downloads information corresponding to the authority information version from the authority service server (S40). Thereafter, the client server performs the operation of user authority certification (S50).

As a result of comparison (S30), if the authority information version received from the authority service server is lower than or equal to the authority information version maintained by the client server (NO), the client server performs the operation of user authority certification without performing other separate operations such as downloading (S50).

Although not shown in the figure, a method of providing a user authority certification service according to an embodiment of the present disclosure may further include uploading the downloaded the authority information to a user information share memory of the client server after the step of the client server downloading the authority information from the authority service server (S40). The respective steps will be described in detail below with reference to the accompanying drawings.

Figure 3:
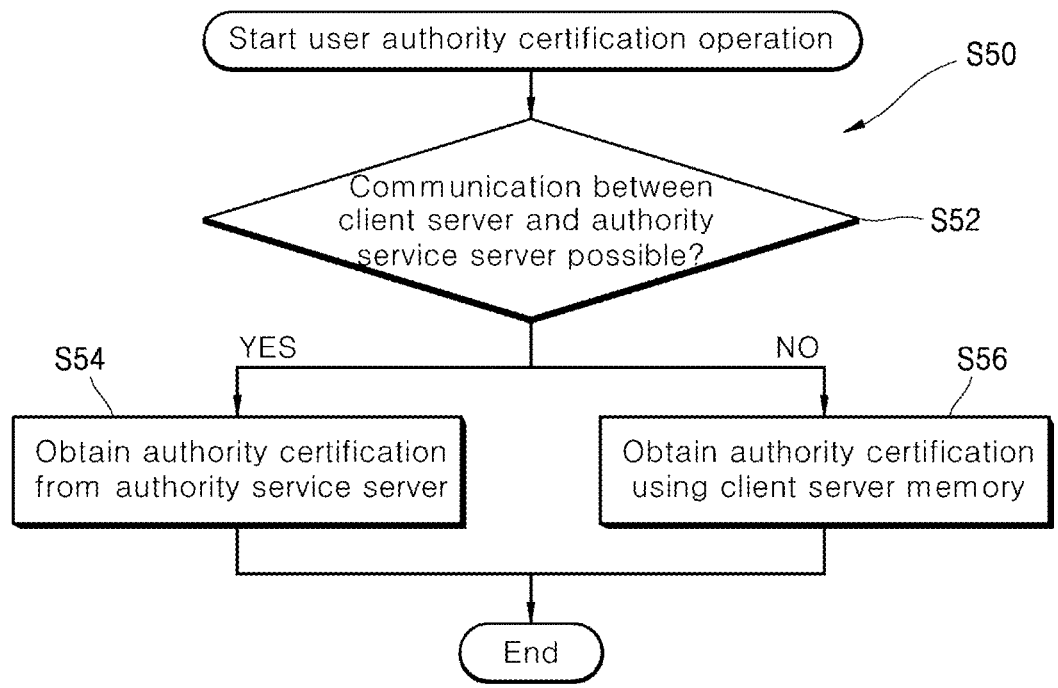
FIG. 3 is a flowchart illustrating sub-steps of the step of performing user authority certification of FIG. 2, according to an embodiment of the present disclosure.

FIG. 3 is a flowchart illustrating sub-steps of the step of performing user authority certification of FIG. 2. Hereinafter, the step of performing user authority certification (S50) in the method for providing a user authority certification service of FIG. 2 will be described in detail with reference to FIG. 3.

As shown in FIG. 3, the step of performing user authority certification (S50) includes providing a user authority certification service when communication between the client server and the authority service server is possible (YES) (S54) and providing the user authority certification service when communication between the client server and the authority service server is not possible (S56).

Herein, the client server cannot communicate with the authority service server in the cases, for example, when the authority service server is unable to operate as it is shut down, or when a communication network between the authority service server and the client server is disabled and thus normal communication cannot be performed.

As shown in FIG. 3, a controller of the client server determines whether communication with the authority service server is possible (S52). If normal communication is possible (YES), the controller obtains authority certification from the authority service server (S54). If normal communication is not possible (NO), on the other hand, the controller obtains authority certification using a client server memory (S56).

Figure 4:
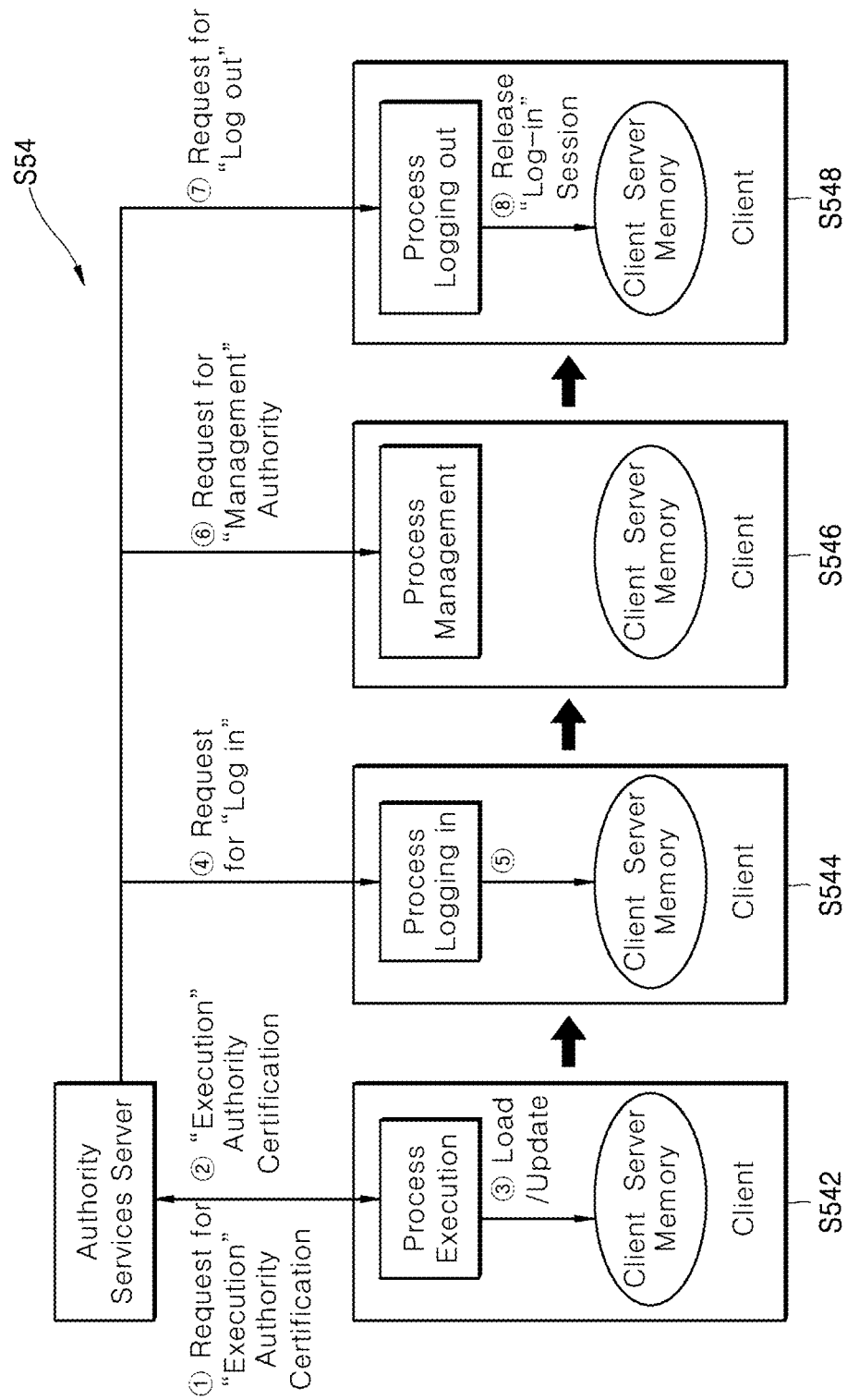
FIG. 4 is a flowchart illustrating the procedure of providing a user authority certification service when communication with an authority service server of FIG. 3 is possible, according to an embodiment of the present disclosure.

FIG. 4 is a flowchart illustrating the procedure of providing a user authority certification service when communication with an authority service server of FIG. 3 is possible.

As shown in FIG. 4, all processes (e.g., execution, logging in, management, logging out, and the like) implemented through the client server are subdivided, and the authority certification operation is performed for each of the subdivided operations according to each user.

Specifically, in the case where the client server can normally communicate with the authority service server, when the client executes a process (S542), the client requests execution authority certification through communication with the authority service server (step ①).

Once the client server obtains the execution authority certification from the authority service server (step ②), the client server loads the information to the memory thereof to update the authority certification information (step ③).

Once the execution step is terminated, when the client logs in (S544), the client makes a request to the authority service server for logging in (step ④). After performing logging in, the client server registers a log-in session in the memory (step ⑤).

When the client performs administration (S546) after the logging in step is terminated, the client makes a request to the authority service server for management authority certification (step ⑥).

When the administration step is terminated, the client makes a request to the authority service server for logging out (step ⑦).

After performing logging out, the client server releases the log-in session in the memory (step ⑧).

In this way, the client server may implement the authority certification operation through communication with the authority service server.

Figure 5:
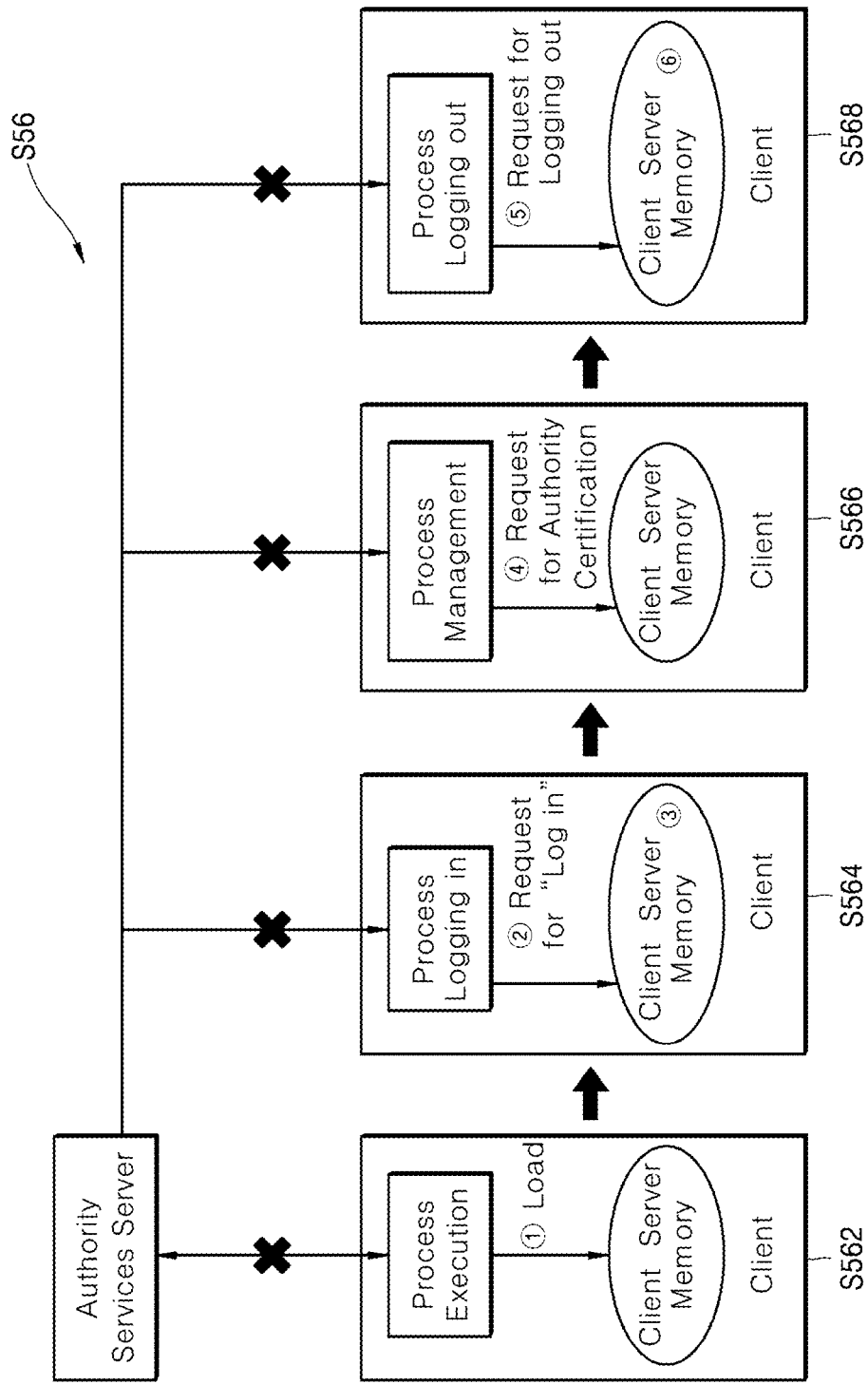
FIG. 5 is a flowchart illustrating the procedure of providing a user authority certification service when communication with the authority service server shown in FIG. 3 is not possible, according to an embodiment of the present disclosure.

FIG. 5 is a flowchart illustrating the procedure of providing a user authority certification service when communication with the authority service server shown in FIG. 3 is not possible. In the step of FIG. 5, all processes (e.g., execution, logging in, management, logging out, and the like) implemented through the client server are subdivided, and the authority certification is performed for each of the subdivided operations according to each user, as in the step of FIG. 4.

As shown in FIG. 5, if the client server cannot perform the authority certification operation through the authority service server because the authority service server is unable to operate or the communication network is disabled, the authority certification operation may be performed by utilizing the client server memory.

When the client executes a process (S562), the client may obtain certification of an execution authority by loading the information to the client server memory (step ①).

When the client desires to perform logging in (S564), the client makes a request to the client server memory for logging in (step ②). Then, the client server memory may register a log-in session requested by the client (step ③).

When the client desires to perform an administration operation (S566), the client may make a request to the client server memory for management authority certification and obtain the authority certification (step ④).

When the client desires to log out (S568), the client makes a request to the client server memory for logging out (step ⑤). Then, the client server memory may release the log-in session requested by the client (step ⑥).

In this way, the client server may perform the authority certification through communication with the client server memory.

If normal communication between the client server and the authority service server is resumed during the procedure of the client server obtaining user authority certification using the client server memory, the client server may stop obtaining the user authority certification from the client server memory, and obtain the authority certification from the authority service server.

Figure 6:
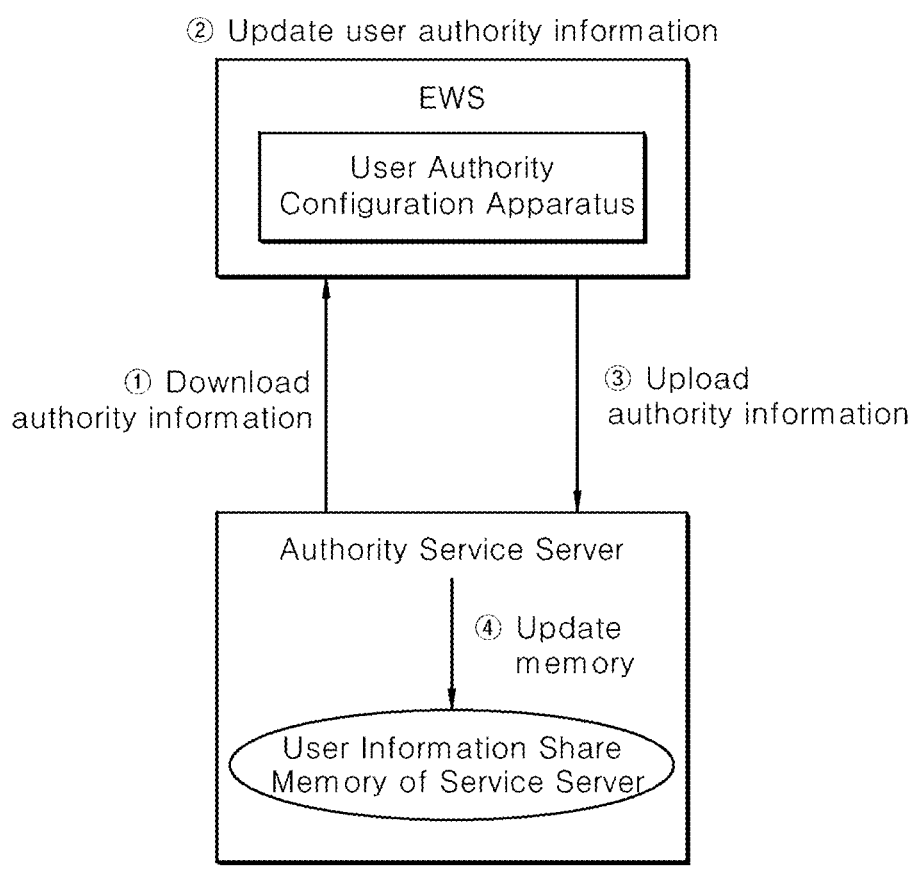
FIG. 6 is a flowchart illustrating the procedure of updating user authority configuration according to a method for providing a user authority certification service according to an embodiment of the present disclosure.

FIG. 6 is a flowchart illustrating the procedure of updating user authority configuration according to a method for providing a user authority certification service according to an embodiment of the present disclosure.

As shown in FIG. 6, an administrator may configure or change a user authority using a separate user authority configuration apparatus.

For example, a user authority information configuration apparatus such as an engineering work station (EWS) downloads authority information from the authority service server through communication with the authority service server (step ①).

The user authority information configuration apparatus may update the user authority information based on the authority information downloaded from the authority service server (step ②), and then upload the updated authority information to the authority service server (step ③).

The authority service server may load the updated authority information received from the user authority information configuration apparatus to the memory therein to update the authority information (step ④).

In this way, the user authority information may be changed using a separate user authority information configuration apparatus.

Meanwhile, the user authority configuration information may also be updated through the client server.

Figure 7:
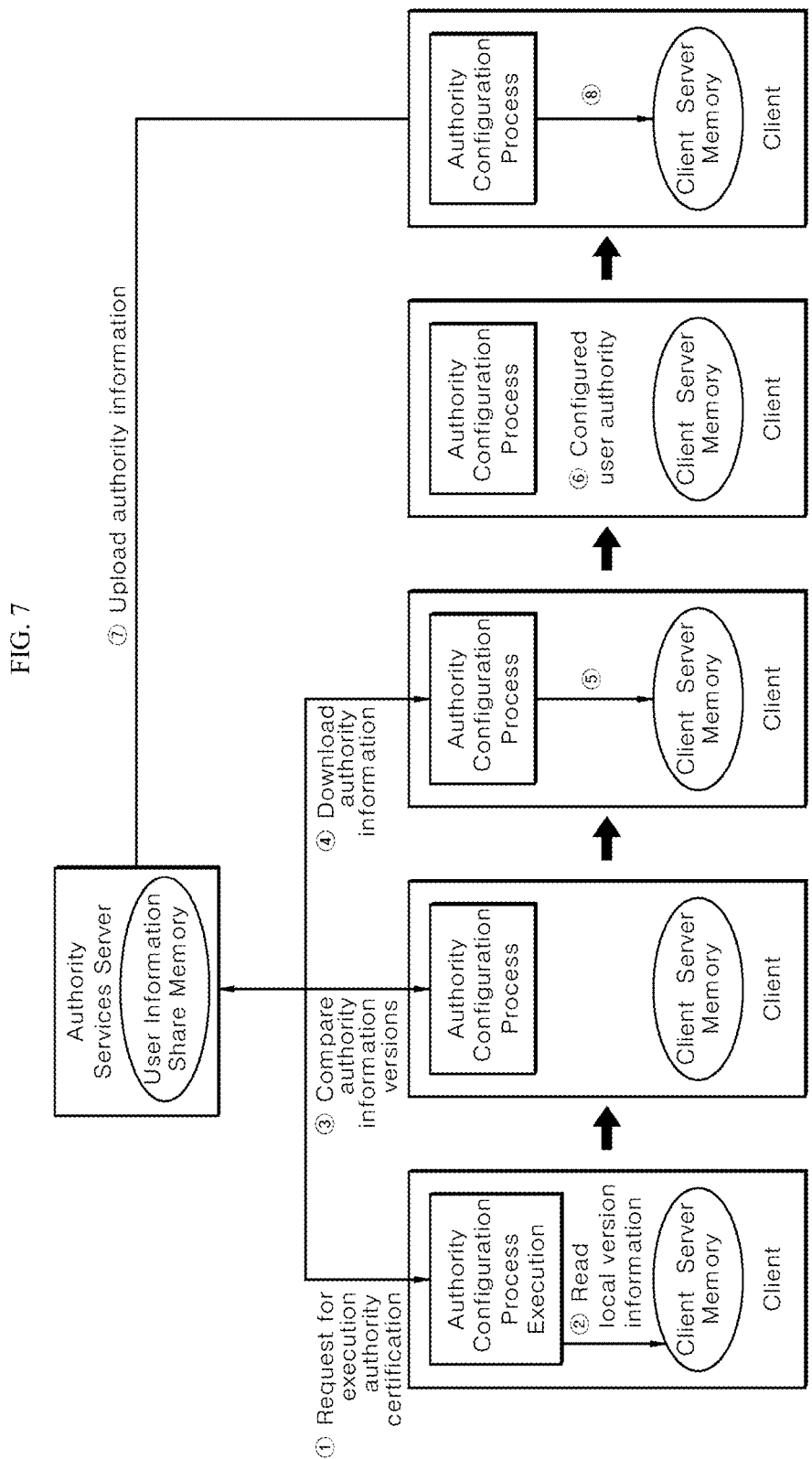
FIG. 7 is a flowchart illustrating the procedure of updating user authority configuration through a client server according to a method for providing a user authority certification service according to an embodiment of the present disclosure.

FIG. 7 is a flowchart illustrating the procedure of updating user authority configuration through a client server according to a method for providing a user authority certification service according to an embodiment of the present disclosure.

Referring to FIG. 7, on the assumption that normal communication is possible between the client server and the authority service server, the client may perform the operation of user authority configuration. That is, the client server including obtained authority certification for the operation of authority configuration from the authority service server may perform the user authority configuration.

Specifically, the client server makes a request to the authority service server for execution authority certification (step ①).

Upon obtaining certification of the execution authority from the authority service server, the client server receives local version information from the memory (step ②).

Then, the client server compares the authority information version of the authority service server with the authority information version stored in the memory (step ③), and determines whether to download authority information.

After the client server downloads the authority information from the authority service server (step ④), the client server may load the downloaded authority information to the client server memory to update the memory (step ⑤).

Then, the client server performs the user authority configuration by configuring a user authority (step ⑥), and uploads the updated authority information to the authority service server (step ⑦).

Thereafter, the client server may update the client server memory (step ⑧).

Figure 8:
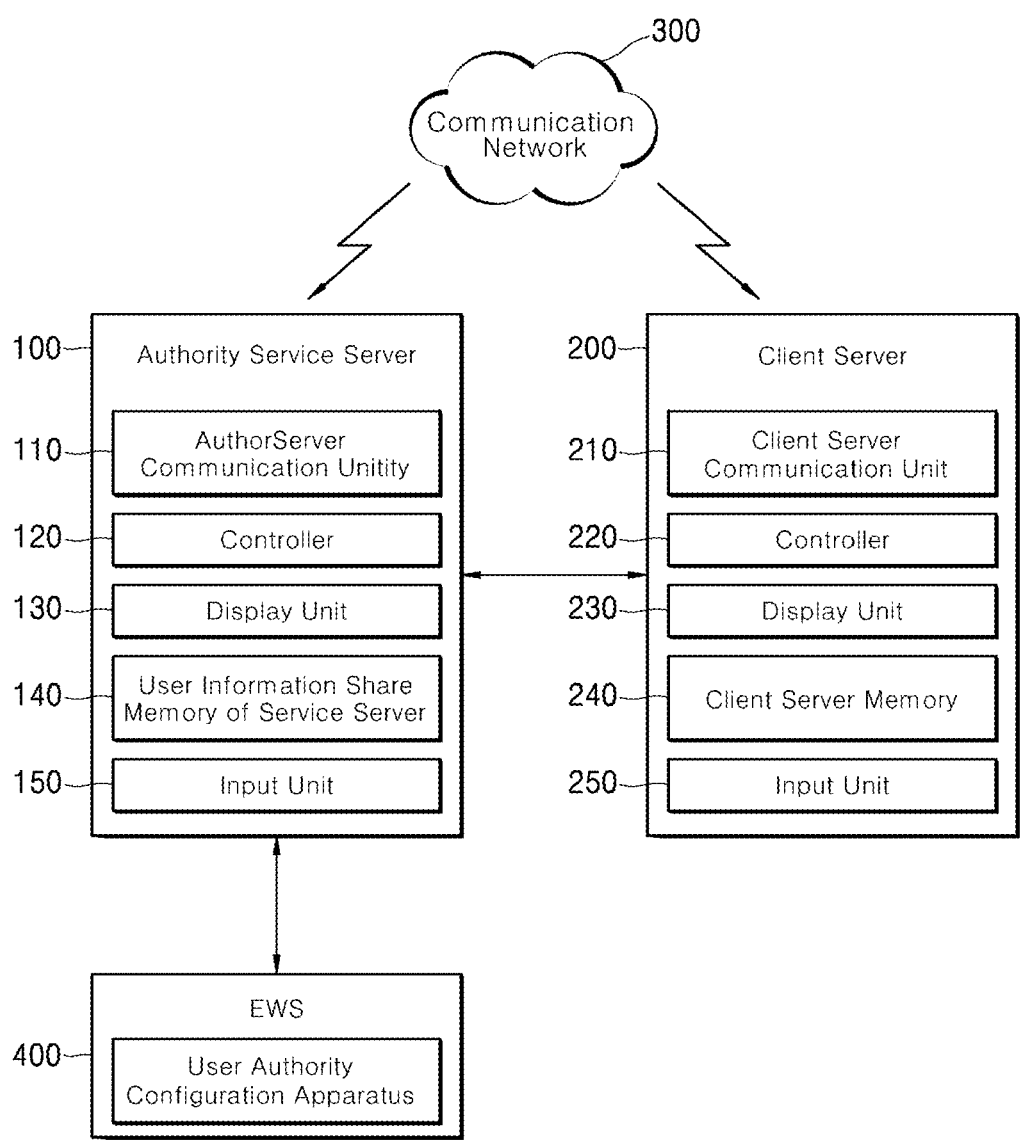
FIG. 8 is a block diagram illustrating a system for providing a user authority certification service according to an embodiment of the present disclosure.

FIG. 8 is a block diagram illustrating a system for providing a user authority certification service according to an embodiment of the present disclosure.

Referring to FIG. 8, a user authority certification system includes an authority service server 100, a client server 200, and a communication network 300. The user authority certification system may further include a user authority configuration apparatus 400 such as an engineering workstation (EWS).

The authority service server 100 may include a memory 144 for storing data such as user authority information and authority information version.

In addition, the memory authority may further store data for supporting various functions of the authority service server 100.

For example, the memory may store multiple application programs driven by the authority service server, data for operation of the server or commands.

The authority service server 100 may further include a server communication unit 110 for performing communication with the client server 200 over the communication network 300.

Similarly, the client server 200 may also include a client server communication unit 210 for performing communication with the authority service server over the communication network 300.

The communication network 300 may implement communication according to a wired communication scheme or wireless communication scheme.

The wired communication scheme may be, for example, Ethernet. The wireless communication scheme may be at least one selected from among Bluetooth, Radio Frequency Identification (RFID), infrared Data Association (IrDA), Ultra Wideband (UWB), ZigBee, and Digital Living Network Alliance (DLNA). However, embodiments of the present disclosure are not limited thereto.

The authority service server 100 and the client server 200 may further include controllers 120, 220, respectively.

The controller 120 of the authority service server 100 controls overall operation of the authority service server 100, and the controller 220 of the client server 200 controls overall operation of the client server 200.

For example, the controller 220 of the client server 200 compares the authority information version maintained by the client server with the authority information version of the authority service server 100, and determines whether to download authority information from the authority service server 100.

In addition, the controller 120, 220 of each server 100, 200 may process signals, data and information input or output through constituents of the authority service server 100 or client server 200, or drive an application program stored in the memory 140, 240 to provide suitable information or functions to the user.

In addition, the authority service server 100 and the client server 200 may further include display units 130 and 230, respectively. The display units 130 and 230 are intended to generate output related to vision in the authority service server 100 and the client server 200.

The display units 130 and 230 and sensors may be arranged in a layer structure or integrated with each other, thereby implementing a touchscreen. The touchscreens may function as input units 150 and 250 for providing an input interface between the authority service server 100 and the user or between the client server 200 and the user, and may also provide output interfaces.

The authority service server 100 and the client server 200 may further include input units 150 and 250, respectively. The input units 150 and 250 are provided to receive information from the user. As described above, the input units 150 and 250 may be integrated with the display units 130 and 230.

In a method for providing a user authority certification service in a client server according to another embodiment of the present disclosure, when a request is made to the authority service server for authority information, the requested authority information is downloaded and maintained, and communication with the authority service server is not possible, authority certification is obtained based on the maintained authority information. Thereby, if the client server does not obtain authority certification through the authority service server, the client server may obtain the authority certification based on the maintained authority information, thereby performing a corresponding engineering operation. Accordingly, regardless of change in the communication condition, operations may be performed by the client server, and therefore operation efficiency may be improved.

According to the embodiments described above, even if the condition of the service of the authority service server is not normal due to operations such as maintenance of the server, or communication with the authority service server is impossible due to a problem with the communication network, the client is capable of normally performing engineering operations such as DB work and graphic editing. Accordingly, a system such as a SCADA/EMS may be stably operated.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Although specific embodiments of the present disclosure have been disclosed for illustrative purposes, it will be apparent to those skilled in the art that various modifications and variations can be made in the present disclosure without departing from the scope of the disclosure. Thus, it is to be understood that the disclosure is not limited to these embodiments only, and is limited only by the claims appended hereto and the equivalents thereof. It is intended that the present disclosure covers the modifications and variations of the present disclosure provided they come within the scope of the appended claims and their equivalents.

What is claimed is:

1. A method for providing a user authority certification service of a client server, the method comprising:
   sending a request for an authority information version to an authority service server;
   receiving the authority information version from the authority service server;
   obtaining a comparison result by comparing the received authority information version with an authority information version of a client server memory;
   determining whether or not to download the authority information of the authority service server based on the comparison result;
   updating the client server memory based on the downloaded authority information of the authority service server when the authority information of the authority service server is downloaded; and
   performing a user authority certification for each process operation by the client server, wherein the user authority certification is performed using the client server memory when normal communication between the client server and the authority service server is not possible,
   wherein performing the user authority certification further comprises:
   performing the user authority certification using the authority service server, when communication between the client server and the authority service server is normal; and
   when communication between the client server and the authority service server is resumed to be normal while the client server performs the user authority certification using the client server memory, stopping performing the user authority certification using the client server memory and conducting performing the user authority certification using the authority service server.

2. The method according to claim 1, further comprising:
   downloading the authority information from the authority service server when the authority information version received from the authority service server is higher than the authority information version of the client server memory.

3. The method according to claim 1, wherein the process operation comprises at least one of: process execution, logging in, process management or logging out.

4. The method according to claim 3, further comprising sequentially obtaining, by the client server, the user authority certification for the at least one of: the process execution, logging in, process management or logging out.

5. The method according to claim 1, wherein the authority service server updates the authority information based on user authority information which is updated by a user authority information configuration apparatus.

6. The method according to claim 5, wherein the user authority information configuration apparatus downloads the authority information from the authority service server, updates the downloaded authority information based on predetermined user authority information and uploads the updated authority information to the authority service server.

7. The method according to claim 1, wherein the authority service server updates the authority information based on user authority information which is updated by the client server.

8. The method according to claim 7, wherein the client server uploads the updated user authority information to the authority service server when the client server obtains the user authority certification for an authority configuration operation from the authority service server.

* * * * *